United States Patent [19]

Mead et al.

[11] Patent Number: 5,291,391
[45] Date of Patent: Mar. 1, 1994

[54] FAST PROGRAMMABLE SCAN LOGIC CONTROLLER METHOD AND APPARATUS

[75] Inventors: Ian D. Mead, Westchester; Jing Liao, Cincinnati, both of Ohio

[73] Assignee: Cincinnati Milacron Inc., Cincinnati, Ohio

[21] Appl. No.: 855,187

[22] Filed: Mar. 20, 1992

[51] Int. Cl.[5] ............... G05B 11/01; G05B 21/02; G05B 13/02
[52] U.S. Cl. .................... 364/148; 364/166; 364/178; 364/179; 364/140
[58] Field of Search ............... 364/148, 178, 179, 162, 364/140, 141, 142, 143, 180, 166; 251/129.01, 129.04, 129.15

[56] References Cited

U.S. PATENT DOCUMENTS

| | | | |
|---|---|---|---|
| 4,404,651 | 9/1983 | Grudowski . | |
| 4,486,830 | 12/1984 | Taylor, Jr. et al. . | |
| 4,635,182 | 1/1987 | Hintz | 364/179 |
| 4,745,541 | 5/1988 | Vaniglia et al. . | |
| 4,749,986 | 6/1988 | Otani et al. . | |
| 4,833,445 | 5/1989 | Buchele . | |
| 5,177,695 | 1/1993 | Sung et al. | 364/179 |
| 5,210,698 | 5/1993 | Topmiller | 364/143 |
| 5,225,974 | 7/1993 | Mathews et al. . | |

Primary Examiner—Jerry Smith
Assistant Examiner—Jim Trammell
Attorney, Agent, or Firm—Frost & Jacobs

[57] ABSTRACT

A programmable controller is disclosed for the purpose of controlling devices such as machine tools and other machinery, and which is often mated with a host computer numerical controller. The programmable controller is configured such that certain user-designated "fast-scan" outputs can operate at much higher speeds than non-designated "normal" outputs, thereby greatly increasing the response time and efficiency of the operations that are controlled by those fast-scan outputs. The programmable controller uses a processor which scans through its user-definable program (including the value of all system inputs and outputs) before it attempts to change the value of any of its outputs. The physical input/output (I/O) interfaces are located on I/O racks, each of which also includes an intelligent bus adaptor. The intelligent bus adaptor includes its own processor which periodically communicates with the processor in the programmable controller. The intelligent bus adaptor's processor controls the fast-scan outputs located on that particular I/O rack within very short time intervals, and allows for a response time that is an order of magnitude faster than the response time of normal outputs of the programmable controller.

16 Claims, 5 Drawing Sheets

FIG. 4A
(NORMAL IBA ROUTINE)

FIG. 4B
(FAST-SCAN IBA ROUTINE)

FAST PROGRAMMABLE SCAN LOGIC CONTROLLER METHOD AND APPARATUS

TECHNICAL FIELD

This invention relates to programmable controller equipment used for controlling devices such as machine tools and other machinery. The present invention is particularly directed to programmable controllers which are often utilized with computer numerical controllers, and, more specifically, to a method and apparatus for increasing the operating efficiency and speed of a programmable controller by providing fast-scan control capabilities for user designated fast-scan outputs simultaneously with standard scan cycle control of non-designated outputs.

BACKGROUND OF THE INVENTION

Programmable logic controllers (PLC's, or programmable controllers) are common in industrial manufacturing facilities for control of various types of manufacturing equipment and plant or process equipment. Programmable controllers can be used as "stand-alone" controllers, in which the PLC itself is the primary control intelligence of the system, or can be used in cooperation with a more powerful computing or control system. In the machine tool industry, programmable controllers are often mated with a host computer numerical controller (CNC), which performs the calculation intensive tool path tasks that are necessary to properly control the associated machine tool in real time.

Programmable controllers typically contain a set of logical instructions within their user-definable program. Such instructions are user-changeable, and typically include instructions to determine the value of certain physical inputs, perform logical and numeric calculations based upon that information, perform certain time-dependent or count-dependent operations based on that information, and to determine the proper value of certain physical outputs which are controlled by the PLC. An example of an exemplary programmable controller known in the art is disclosed in U.S. Pat. No. 4,486,830 by Taylor, Jr. et al.

The user-definable program of a PLC must be periodically reviewed or "scanned" so that the value of internal variables that are associated with inputs can be determined and updated, and also so that the value of the associated outputs can be controlled, as required by the results of any mathematical or logical equations. In common PCL's, the user-definable program is scanned in a manner dictated by the results of the PLC's user-definable program. After the scan has been completed, the outputs of the PLC can be set to their proper values. Typically, PLC's do not communicate directly with the input and output equipment via address or data buses, but instead have special serial or parallel communication paths between the equipment installed in the input/output (I/O) racks which hold a bus adaptor, the physical input interfaces (which typically contain several physical inputs each), and physical output interfaces (which typically contain several physical outputs each). Only after a complete scan of the user-definable program has been completed do the PLC's attempt to change any output values by sending down messages to their associated I/O racks.

PLC systems available heretofore can only update their associated outputs with new information at a maximum rate of once per "scan" cycle of the PLC's user-definable program. The amount of time required to perform a complete scan of the user-definable program is dependent upon the scanning rate and the size of the user-definable program used in a given PLC. Typical times for such a single scan often fall within the range of 25 to 50 ms for the more complex applications that are used in controlling machine tools.

In a machine tool application wherein a host CNC is associated with a PLC, the PLC still works along the general lines described above, communicating with its inputs and outputs via communication paths to interfaces on I/O racks. In such systems, the CNC will perform the tool path calculations and the PLC will perform many, if not most, of the binary calculations. The PLC in such systems is the device that directly controls many of the physical binary outputs (two-state "on" or "off" outputs) used to control devices such as tool changer mechanisms and pallet shuttles, or the like. In smaller (less complex) systems, the PLC can perform all of the above calculations (both analog and binary), thereby eliminating the need for a host CNC.

Systems heretofore using PLC equipment have not been capable of controlling their outputs in response to certain changes in any of the associated inputs in less time than one scan cycle. Since an entire scan cycle of the user-definable program must be completed before the PLC could implement changes, the associated outputs could also only change value at the end of at least one of such scan cycles which did not commence until after the associated inputs which control those outputs have changed state. This timing limitation exists even in systems using CNC equipment, since as the CNC communicates with its associated PLC, the PLC must then scan the input portion of the input/output table of its user-definable program for changes of value in any of its equations (due to state changes in physical inputs, for example) before "deciding" that the PLC should change the value of any of its outputs. The CNC, operating as a host computer to the overall system, cannot force the PLC to perform its scanning cycle and its output updating routines in less time than the PLC is capable. In modern day applications requiring ever increasing speed and complexity, such limitations are a substantial roadblock to efficiency and increased production.

SUMMARY OF THE INVENTION

Accordingly, it is a primary object of the present invention to overcome the shortcomings and limitations of prior programmable controllers.

It is also an object of this invention to provide a programmable controller that has the capability of responding to changes in input data within less than once per scan cycle of the PLC.

It is yet another object of the present invention to provide a programmable controller that has the capability of responding to changes in input data, for both analog and binary inputs, within less than once per PLC scan cycle by controlling selected outputs, both analog and binary, using a "fast-scan" function which repeatedly occurs within a shorter time interval than a single scan cycle of the PLC.

It is a further object of the present invention to provide a programmable controller that uses an intelligent bus adaptor, which is in communication with an associated I/O rack, for performing logical and numerical calculations that are based on the value of certain inputs and other data, and which is capable of controlling the value of selected outputs using a fast-scan function repeated many times within a single scan cycle of the PLC.

It is a yet further object of the present invention to use an existing programmable controller which includes an intelligent bus adaptor, and to use the intelligent bus adaptor's excess processing time to perform fast-scan functions which control the value of selected outputs within time intervals which are less than that of a single scan cycle of the PLC.

Additional objects, advantages and other novel features of the invention will be understood from the description that follows or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved programmable controller is disclosed which can designate certain outputs as "fast-scan" outputs, wherein the fast-scan outputs can be controlled much more frequently than non-designated "normal" outputs (every output is defined as a "normal" output unless it becomes "designated" as a fast-scan output), and without impairing the rate of execution of the normal outputs. Each normal output of the system can be programmed to become a fast-scan output by the programmable controller, as designated by the user's operating program that resides on the PLC. Once a given output becomes a fast-scan output, it no longer is directly controlled by its normal equation that resides within the PLC, but instead becomes directly controlled by a sub-program that can reside elsewhere within the overall control system, such as within an intelligent bus adaptor. The sub-program controls the given output by overriding whatever value the normal equation would assign to that given output. Each fast-scan sub-program (or function) can detect current conditions of certain input and, in less than one scan cycle, determine whether its associated fast-scan output should change its value or remain at its present value. Fast-scan outputs may be either analog or binary in nature, and the equations that control the fast-scan outputs can respond to various information, such as physical inputs (analog or binary), internal variables (analog or binary), time-dependent variables, count-dependent variables, and/or any of the other information (such as status flags) available within a particular programmable controller system. The fast-scan functions can operate on certain existing PLC's that have intelligent bus adaptors which have excess processing capability due to their large enough memory and computing capacity. The excess processing capability is used to perform the desired fast-scan functions without impairing the control capacity or controlling rate of the normal PLC routines.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification illustrates several aspects of the present invention, and together with the description serves to explain the principles of the invention. In the drawing.

DETAILED DESCRIPTION OF THE PREFERRED EMBODIMENT

Reference will now be made in detail to a preferred embodiment of the invention, an example of which is illustrated in the accompanying drawing, wherein like numerals indicate the same elements throughout the views.

Figure 1:
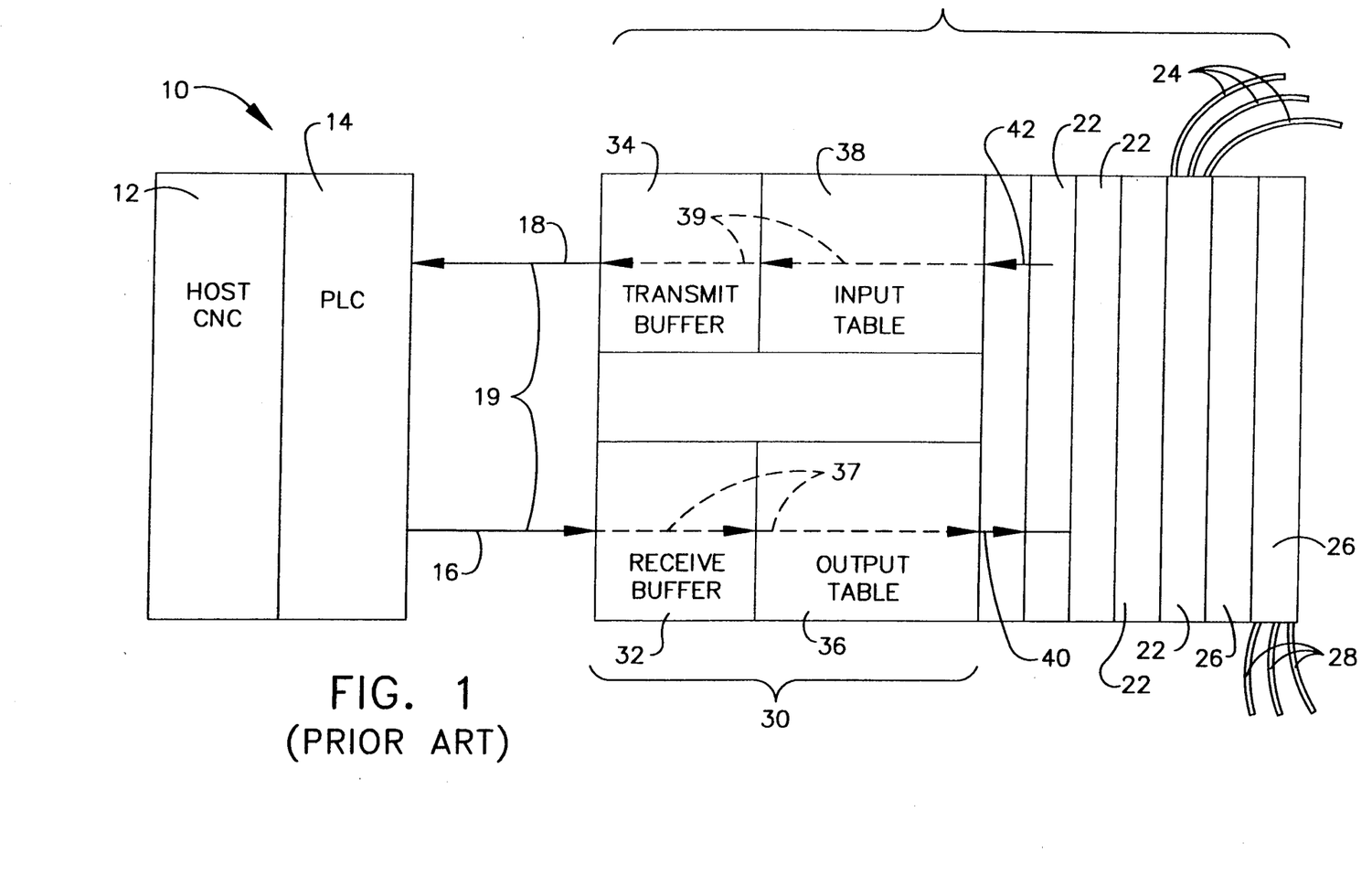
FIG. 1 is a diagrammatic view of a prior art control system having a host CNC, an associated programmable logic controller, and an input/output rack.

Referring now to the drawing, FIG. 1 depicts a conventional computer numeric control (CNC) system 10. CNC system 10 includes a host computer numerical controller 12 with an associated programmable logic controller (PLC) 14. In order for the CNC/PLC combination to perform physical control, the CNC/PLC must communicate with physical inputs and physical outputs, which are commonly found on I/O racks (e.g., I/O rack 20 depicted in FIG. 1). The PLC 14 can communicate with equipment on I/O rack 20 via either a serial or parallel communication path, but in either case this communication path should have a high-speed data capacity. A high-speed communication path 16 sends messages from the PLC 14 to equipment on I/O rack 20, and an associated high-speed communication path 18 sends messages from the equipment on I/O rack 20 to PLC 14. It is common to use a half duplex serial communication path 19 to combine communication paths 16 and 18 into one serial communications path, which can have a high-speed data capacity of two (2) megabits per second.

The primary purpose of this conventional CNC/PLC system 10 is to control physical output devices based upon the status of the system's physical input devices. Physical input devices can be connected through wires 24 into a physical input interface 22, and more than one physical input interface 22 can exist in a typical I/O rack 20. I/O rack 20 also includes one or more physical output interfaces 26, which communicate to physical output devices through wires 28. The signals passing through the half duplex serial communication path 19 are not fed directly to the physical input interfaces 22 and the physical output interfaces 26, but instead are passed through an intelligent bus adapter (IBA) 30. The IBA 30 receives signals from the PLC 14 into a receive buffer 32, and transmits signals to the PLC 14 via a transmit buffer 34.

The PLC 14 communicates to the IBA 30 by sending information formatted in data packets. A data packet from the PLC 14 usually includes, but is not restricted to, information such as the following:

(1) the rack address (there can be more than one I/O rack);
(2) the data packet length (which can vary);
(3) the control command information (giving status of binary outputs which have been disabled—turned off—, and analog outputs which have been disabled by outputting a zero value or held at the last non-zero value; it also could be a global disable status message);
(4) the output data message, which can include both binary and analog data;
(5) the data packet end flag; and
(6) the error detection and cyclic redundancy check (CRC) messages.

Once a data packet is received by the receive buffer 32, the data is manipulated (by means which will be discussed below) and placed into an output table 36. As the data is placed into output table 36 it can be sent, via logical data path 37 (through the receive buffer 32 and output table 36) to a logical data path 40, which in turn communicates to the physical output interfaces 26.

After a data packet is received by IBA 30 from PLC 14, the IBA 30 sends a message of its own back to the PLC 14. This is accomplished by sending the data that is in the transmit buffer 34 through the half duplex serial communication path 19 to PLC 14. In order for transmit buffer 34 to contain correct data, the most recent status of the inputs must be determined by the IBA 30 on I/O rack 20. This is accomplished by the physical input interfaces 22 first sensing the state of the physical input devices attached to this particular I/O rack 20, and then having that information read by PLC 14 via logical data path 42, which is attached to the physical input interfaces 22. Once the information is passed through logical data path 42, it is received into input table 38. This input data then flows, via logical data path 39, through the input table 38 and the transmit buffer 34, and finally out through the path designated by the numeral 18 of communication path 19. It will be understood that logical data paths 37, 39, 40, and 42 are depicted as logical paths of a common data bus.

The programmable logic controller 14 of the prior art shown in FIG. 1 includes its own internal memory which receives input data via communication path 18. PLC 14 is programmed with a set of equations which are evaluated, based upon the most recent retrieved status of the physical inputs, to determine the value of all the physical outputs that are associated with the individual I/O racks 20. PLC 14 can have quite an extensive set of equations relating to information such as the status of what are termed "internal" data elements (internal data elements are merely the results of equations which are not directly communicated to physical outputs), the physical status of inputs, and/or the status of either physical or internal data elements that are time-dependent in nature.

Programmable logic controller (e.g., 14) previously available evaluate all of their equation according to the user-definable program until they finish a complete "scan" of all of such equations. Depending upon the size of the user-definable program in a PLC 14, such a scan can typically require 25 to 50 ms before it is complete.

At the end of such a scan interval, a data packet is sent through the communication path 16 to the IBA 30 on I/O rack 20. This transmitted message will then provide the latest control data to the physical output devices which are connected to physical output interfaces 26 of the I/O rack 20.

After a very short time period (typically less than two (2) milliseconds), the IBA 30 on I/O rack 20 will send back a message via communication path 18 providing PLC 14 with the latest status of the physical inputs which are connected to the physical input interfaces 22. The entire length of time to transmit and receive a typical message can be as little as two milliseconds in a typical PLC, as illustrated by the embodiment of FIG. 1. As will be understood, the shortest possible time interval that a given output can change value in such an embodiment is the length of time that is required for PLC 14 to execute one complete scan of the equations that reside in its memory.

Figure 2:
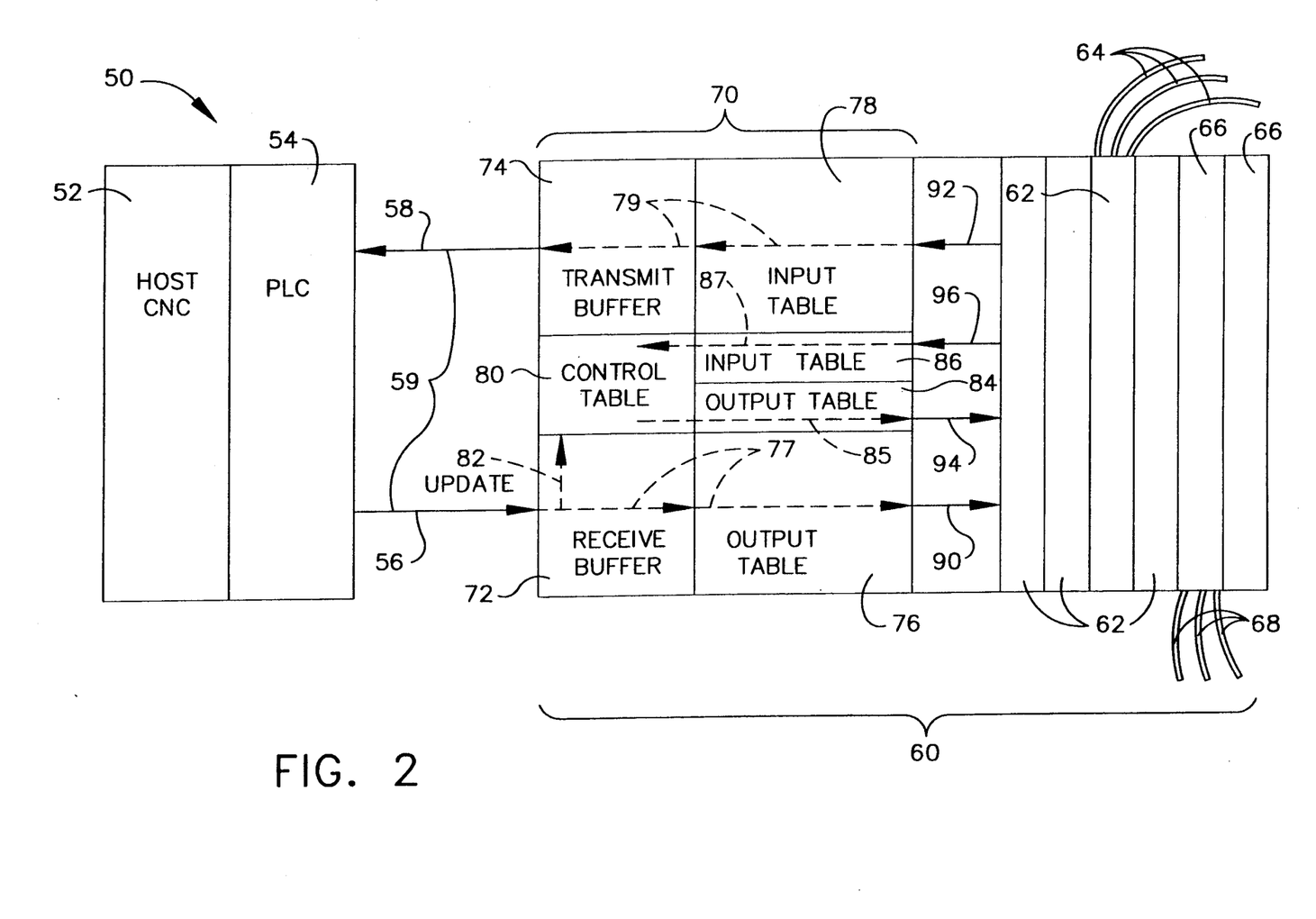
FIG. 2 is a diagrammatic view showing a control system of the present invention using a host CNC with an associated programmable logic controller, and having an input/output rack, which in this instance, however, includes the fast programmable scan logic features of the present invention.

FIG. 2 depicts a fast-scan CNC control system 50 of the present invention, and includes the fast programmable scan logic function. System 50 includes a host CNC 52 and an associated PLC 54, similar to the CNC 12 and PLC 14 described above. PLC 54 communicates data to the equipment on at least one I/O rack 60 via high-speed serial or parallel data paths 56 and 58. As in the prior art of FIG. 1, a single half duplex serial communication path 59 can be used (performing the functions of data paths 56 and 58) as long as it has a sufficiently high data rate, such as two (2) megabits per second or higher.

I/O rack 60 includes at least one physical input interface 62, containing at least one physical input, which is connected (e.g., via wires 64) to physical input devices such as sensors, and at least one physical output interface 66, containing at least one physical output, which is connected (e.g., via wires 68) to physical output devices such as motors, valves, solenoids or the like. The physical I/O interfaces 62 and 66 can either be binary or analog interfaces, depending upon the application being controlled by the system 50. I/O rack 60 also includes an intelligent bus adaptor 70.

The intelligent bus adapter (IBA) 70 of system 50 includes the fast-scan feature of the present invention. Messages sent from PLC 54 via communication path 56 are received by receive buffer 72. "Normal" PLC signals (those signals that have nothing to do with any fast-scan features of IBA 70) are then sent to the output table 76 and are communicated via the normal PLC logical data path 90 to the physical output interfaces 66. In this instance, the logical data path 77 provides the means for communicating the output data through receive buffer 72 and output table 76 to data path 90.

If a data packet received from PLC 54 includes some "fast-scan" information, described below, then that information would not flow through logical data path 77, but instead is directed through logical data path 82, which updates the control table 80. Control table 80 holds all of the information for fast-scan functions. Once a fast-scan function is enabled, by means which will be discussed below, that function will then take over control of a certain physical output in one of the physical output interfaces 66 of I/O rack 60. Before determining what the value of that particular fast-scan output should be, however, the state of the inputs that are used to provide necessary information for that particular function must be determined.

A data packet communicated from the PLC 54 to the IBA 70 will preferably include the following information:
(1) the rack address;
(2) the packet length;
(3) the control command information;
(4) the output data message, including both binary and analog information;
(5) the fast-scan message;
(6) the packet end flag information; and
(7) the error detector and the CRC information.

The fast-scan message portion of the data packet usually includes but is not restricted to the following information:
(1) command to enable the fast-scan function upon system initialization;
(2) commands to enable or disable a particular output (there being a plurality of individual outputs that can be controlled by the fast-scan functions of a single IBA 70);
(3) the logical or mathematical equation for each single output;
(4) the input addresses;
(5) the output addresses;
(6) the output invert flag, if desired, for binary outputs; and
(7) the lock or unlock flag, if desired, for binary outputs.

Not all of the data for a particular fast-scan function need be sent with each data packet. For example, the logical equation for a fast-scan output need not be sent in every data packet for a particular fast-scan function once the initial equation has been sent. The only time the logical equation for a fast-scan output would be sent, once it has been enabled, is if that equation was to be updated or modified, as discussed above.

The state of the physical input devices that are connected to physical input interfaces 62 are determined through two different logical data paths 92 and 96 (which are part of a common data bus). Logical data path 92 is the normal PLC data path to the input interfaces, which sends data into the input table 78. Input table 78 includes normal PLC input information which is communicated to transmit buffer 74, for ultimate transmission through data path 58 back to PLC 54. Logical data path 79 is used in this instance to carry input information through input table 78 and transmit buffer 74 to data path 58.

Input information is also carried through the fast-scan logical data path 96 from the physical input interfaces 62 into the fast-scan input table 86. Once the state of the inputs are placed into fast-scan input table 86 they are transmitted via logical data path 87 into control table 80, wherein appropriate inputs are placed into the equations which make up the fast-scan functions. These fast-scan functions determine the correct value of the fast-scan outputs. Once all of the enabled fast-scan functions have been updated, the associated outputs can then be properly controlled.

The appropriate data within control table 80 is sent to the fast-scan output table 84 via logical data path 85. Once the fast-scan output table 84 has been set, the value of the appropriate outputs on physical output interfaces 66 are controlled by a message sent through the fast-scan logical data path 94 to the physical output interfaces 66. As discussed above, fast-scan outputs are controlled solely by the fast-scan functions of IBA 70, and are no longer controlled by the normal PLC output table 76. It will be understood that logical data paths 77, 79, 82, 85, 87, 90, 92, 94, and 96 are merely descriptive logical flow of data which are represented by signals that are conducted on a common data bus, which is described in greater detail below.

In previous PLC arrangements, as illustrated in FIG. 1, an updated value of an output cannot be changed more frequently than it takes for a complete scan through the memory of PLC 14. In the illustrated embodiment of system 50, which includes the fast-scan features of the present invention, if an output is configured as a fast-scan output, it can have its value changed relatively often (e.g., as often as every two milliseconds or less) by use of the fast-scan system within IBA 70. This greatly reduced interval between updates of control of the fast-scan outputs is possible because of the limited number of operations that are required to complete all of the fast-scan functions within the IBA 70, as compared to the much larger number of functions that must be completed by the PLC 54.

Figure 3:
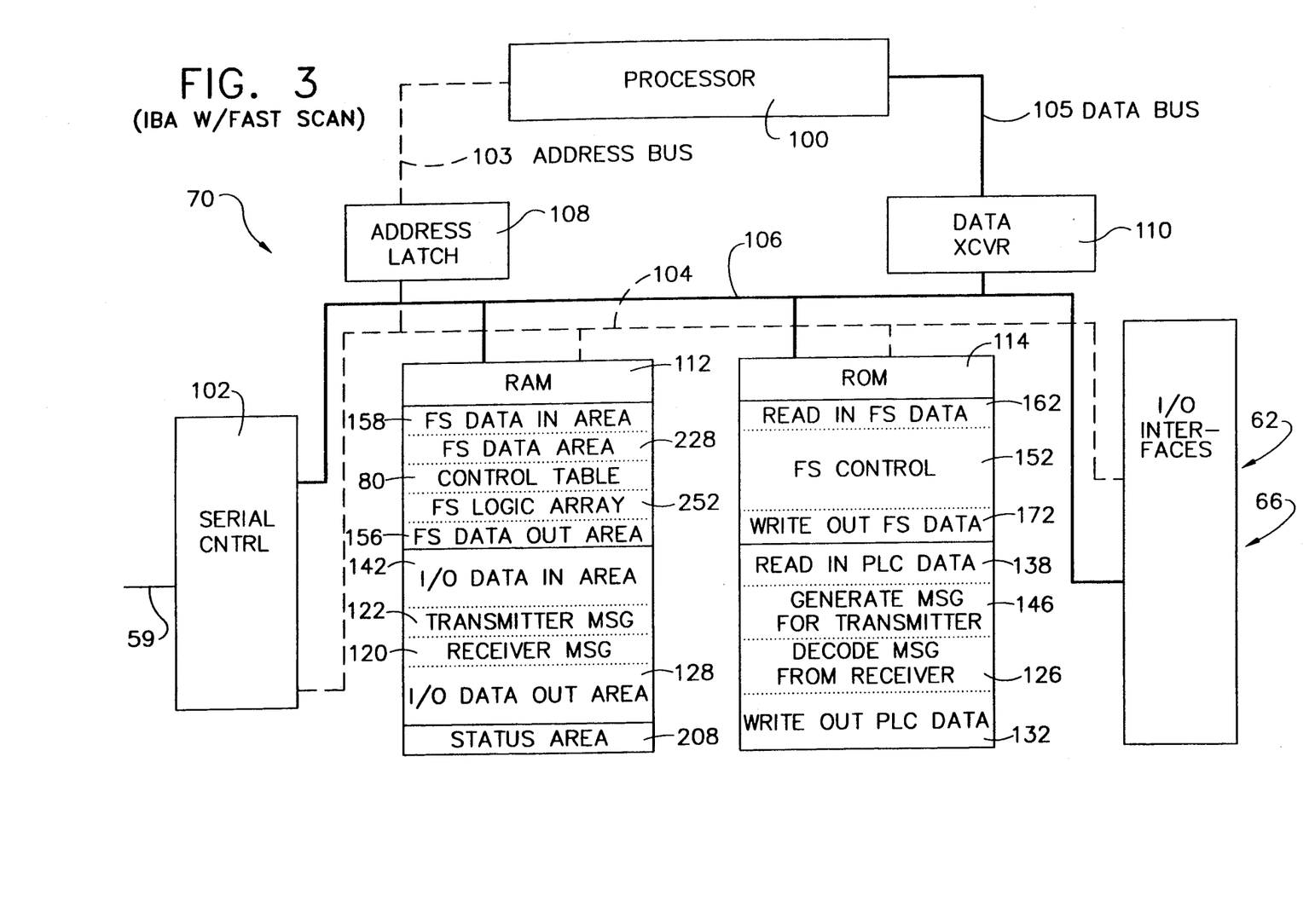
FIG. 3 is a block diagram illustrating the major components of an intelligent bus adapter having the fast programmable scan logic features of the present invention.

FIG. 3 is a combination hardware block diagram and data flow chart of a preferred intelligent bus adapter (IBA) 70 which contains the fast-scan features of the present invention. The overall control of IBA 70 is performed by a processor 100, which is typically a microprocessor (preferably an Intel 80C186 integrated circuit). Processor 100 controls the messages that flow to and from the PLC 54 and the physical input/output interfaces 62 and 66. The high-speed serial path 59 is connected into a serial communication controller 102, which preferably is an Advanced Micro Devices AM82526 CMOS integrated circuit. Serial communication controller 102 has data ports which are connected to data bus 106, and address ports which are connected to the address bus 104.

Processor 100 is connected to address bus 103 and data bus 105. The processor 100 is isolated from the system address bus 104 and data bus 106 by a set of address latches 108 and data transceivers 110, respectively. Processor 100 is in communication with memory devices, such as read only memory (ROM) 114 and random access memory (RAM) 112 (areas of which are also known as registers), via the address and data buses 103 and 104, and 105 and 106, respectively. Processor 100 is also in communication, via the same address and data buses, with physical input interfaces 62 and physical output interfaces 66.

The outputs within I/O rack 60 are all set to zero (turned off) upon initialization of the PLC system, which includes the initialization of IBA 70. After that occurs, the I/O rack outputs can be commanded by either normal PLC functions or fast-scan functions to change their state. This cannot occur until after IBA 70 receives its first message from PLC 54, after which IBA 70 will have stored within its RAM 112 (by routines described below) various PLC output information (output table 76) and fast-scan equations, which ultimately determine the state of each of the outputs within I/O rack 60.

As a typical data packet is received through serial path 59 at the serial communication controller 102, the received data packet information is loaded into RAM 112 via a DMA (dynamic memory access) channel (not shown). At the completion of this event, a high-priority maskable interrupt is generated at processor 100. The date packet information is stored in a receiver message area 120 (part of RAM 112), which is the same as receive buffer 72 (see FIG. 2). Once the message is in RAM, it is decoded by a decode message from receiver routine 126, which is part of the computer program stored in ROM 114. For normal PLC information, the received message information is stored in the I/O output data area 128 (part of RAM 112), which is the same as output table 76 (see FIG. 2). The data which is associated with any fast-scan functions is not, however, placed into the I/O output data area 128, but instead is operated on (scrutinized with the appropriate information extracted for further use in the system) by the fast-scan control routine 152, discussed in greater detail below.

The I/O output data is operated on by the write PLC output data routine 132, which is part of the computer program stored in ROM 114. The write PLC output data routine 132 then communicates the most recent value of all of the outputs that are under normal PLC control to the actual physical output interfaces 66, by communicating through the system buses. It will be understood that both system data bus 106 and system address bus 104 are used to read input data from the physical input interfaces 62 and to write output data to the physical output interfaces 66. Such reading and writing to and from the interfaces will be referred to hereafter as occurring by use of the system data bus 106.

The IBA with fast-scan features 70 also has the capability of determining the current value of all of the inputs that are required for normal PLC functions. To perform these functions, again under control of processor 100, the actual state of the physical input devices is determined by physical input interfaces 62 under the control of a read PLC input data routine 138, which is part of the computer program stored in ROM 114. PLC input data routine 138 has the state of the physical input devices communicated, via the system data bus 106, into the I/O input data area 142 (part of RAM 112), which is the same as input table 78 (see FIG. 2). A message which is to be later transmitted to the PLC 54 is created by a routine 146 (part of ROM 114) using this input information.

The message which is to be transmitted to PLC 54 is communicated, via the system data bus 106, from the I/O input data area 142 into the transmitter message area 122 (part of RAM 112), which is the same as transmit buffer 74 (see FIG. 2). This input information is then sent from transmitter message area 122 through system data bus 106 to the serial communication controller 102 for further communication to PLC 54 via the high-speed serial path 59. All of the inputs in I/O rack 60 are reported through the routines described just above, regardless of whether those same inputs are required for any fast-scan functions. In this way, the program inside PLC 54 is periodically updated with the latest status of all of the inputs of the system, again regardless of whether or not the outputs of the system are controlled by any fast-scan functions.

As discussed above, if the incoming data packet from serial path 59 includes any fast-scan functional information, then that information is decoded by decoding routine 126 and then operated on by fast-scan control routine 152, which is part of the computer program stored in ROM 114. Before any of the fast-scan outputs can properly be controlled, the inputs associated with each of the fast-scan functions must be read to determine their latest values. The value of the physical inputs in physical input interface 62 are read via system data bus 106 and this information is presented to a read input fast-scan data routine 162, which is part of the computer program stored in ROM 114.

After processing by the read input fast-scan data routine 162, the appropriate input information is communicated via system data bus 106 to a fast-scan I/O input data area 158 (part of RAM 112), which is the same as the fast-scan input table 86 (see FIG. 2). This input information must be further processed by the fast-scan control routine 152. The appropriate information is then sent via the system data bus 106 into a fast-scan control table 80, which is part of RAM 112. Fast-scan control table 80 includes all of the fast-scan functional equations which must be acted on during each two (2) ms scan of the fast-scan functions. Examples of equations that can be placed into the of the fast-scan functions. Examples of equations that can be placed into the fast-scan functions are as follows:

Output_Bit_1 = (In_0 AND In_1) OR (In_2 AND In_3 AND In_4)

Output_Bit_2 = (In_2 AND In_3) OR (In_5 AND In_6 AND In_4)

While the examples given are Boolean equations for binary type inputs and outputs, similar equations could be used with analog values for analog type inputs and outputs.

As the fast-scan functions are performed, the new values of the fast-scan outputs are determined. At this point the appropriate data is operated on by fast-scan control routine 152. Fast-scan control routine 152 then communicates appropriate data through system data bus 106 to a fast-scan I/O output data area 156 (part of RAM 112), which is the same as in the fast-scan output table 84 (see FIG. 2). The appropriate data is then operated on by a write output fast-scan data routine 172, which is part of the computer program stored in ROM 114. From this location, the appropriate data is sent through the system data bus 106 into physical output interfaces 66.

Each individual fast-scan function is used to control the appropriate single output in the I/O rack 60. With certain exceptions, discussed below, each fast-scan output controls its given output regardless of what the program in the PLC 54 decides that particular output's value should be by overriding the value assigned by PLC 54 to that particular output.

In a preferred embodiment of the present system, there are up to eight independent fast-scan functions for any one particular IBA 70 having the fast-scan features. Each fast-scan function has its own separate equation, and includes several control features for determining how the function is used and at what times it is used. The particular output for a given fast-scan function, such as Output_Bit_1 given above, must first be "enabled" before the fast-scan equation goes into effect. Up until the point that the fast-scan function is enabled, the associated output is controlled by the normal PLC logic contained in PLC 54. As soon as a message is received by IBA 70 that the fast-scan function is to become enabled, then that fast-scan function goes immediately into effect and that particular output becomes immediately controlled by that fast-scan function. It will be understood that the PLC program, which resides within PLC 54, determines if and when any fast-scan functions are enabled.

It is further contemplated that the fast-scan function, once enabled, may be controlled in several different ways. For example, the fast-scan function can have an "update" command received, which will change the equation for the output of an already enabled fast-scan function. Another possible command of a fast-scan function would be an "invert" command, which sets a binary output into its Boolean inverted state, acting as a "NOT" function.

A further possible command of a fast-scan function would be a "lock" command, which would apply to binary outputs only. The lock command does not affect the fast-scan function until its associated Boolean equation becomes "true" for the first time. In the case of a binary output, the term "true" indicates that the output is in its logic 1 state. After the "lock" command is received, the binary output for that particular fast-scan function remains at logic 1 once the output becomes true for the first time (it is "locked" at logic 1). It should be noted that the fast-scan commands can be used in combination. For example, the lock command and the invert command could be used in conjunction with a single fast-scan function, wherein the binary output becomes "locked" at logic 0 (rather than logic 1) once logic 0 occurs for the first time.

The opposite to the "lock" command is the "unlock" command. In this case, again for binary outputs only, the fast-scan function remains enabled for that particular output, however, the output begins to again respond to its fast-scan Boolean equation rather than remaining at logic 1.

If the fast-scan function is no longer necessary or desired, it can become "disabled". The program in PLC 54 determines both when a fast-scan function is to be enabled or disabled, and controls the use of all other fast-scan commands as well. As stated above, once a fast-scan function is enabled, the associated output for that fast-scan is exclusively controlled by the fast-scan function. On the other hand, when the fast-scan function becomes disabled, the output that was being controlled by the fast-scan function will then very quickly, as part of the fast-scan sequence, become controlled by the PLC's last value for that particular output.

In the case of a binary output, for example, PLC 54 may call for a particular binary output to be at logic 0. If that output was being controlled by a fast-scan function, it may have been in either a logic 0 or a logic 1 state depending upon what that fast-scan function had determined for it. Assuming that the fast-scan function was controlling that output at logic 1 and that the fast-scan function was then disabled, that particular output would immediately (as part of the fast-scan sequence) revert to a logic 0 state, as set by PLC 54.

The fast-scan sequence of control is implemented within the IBA 70; while the PLC's output values for all of the outputs of a particular I/O rack 60 are stored in the I/O output data area 128. If there are associated fast-scan functions occurring for particular outputs, they are stored in the fast-scan I/O output data area 156. When the fast-scan function is disabled, the value stored in area 156 is ignored for that output, and instead the value that is stored in area 128 becomes the controlling value.

Figure 4A:
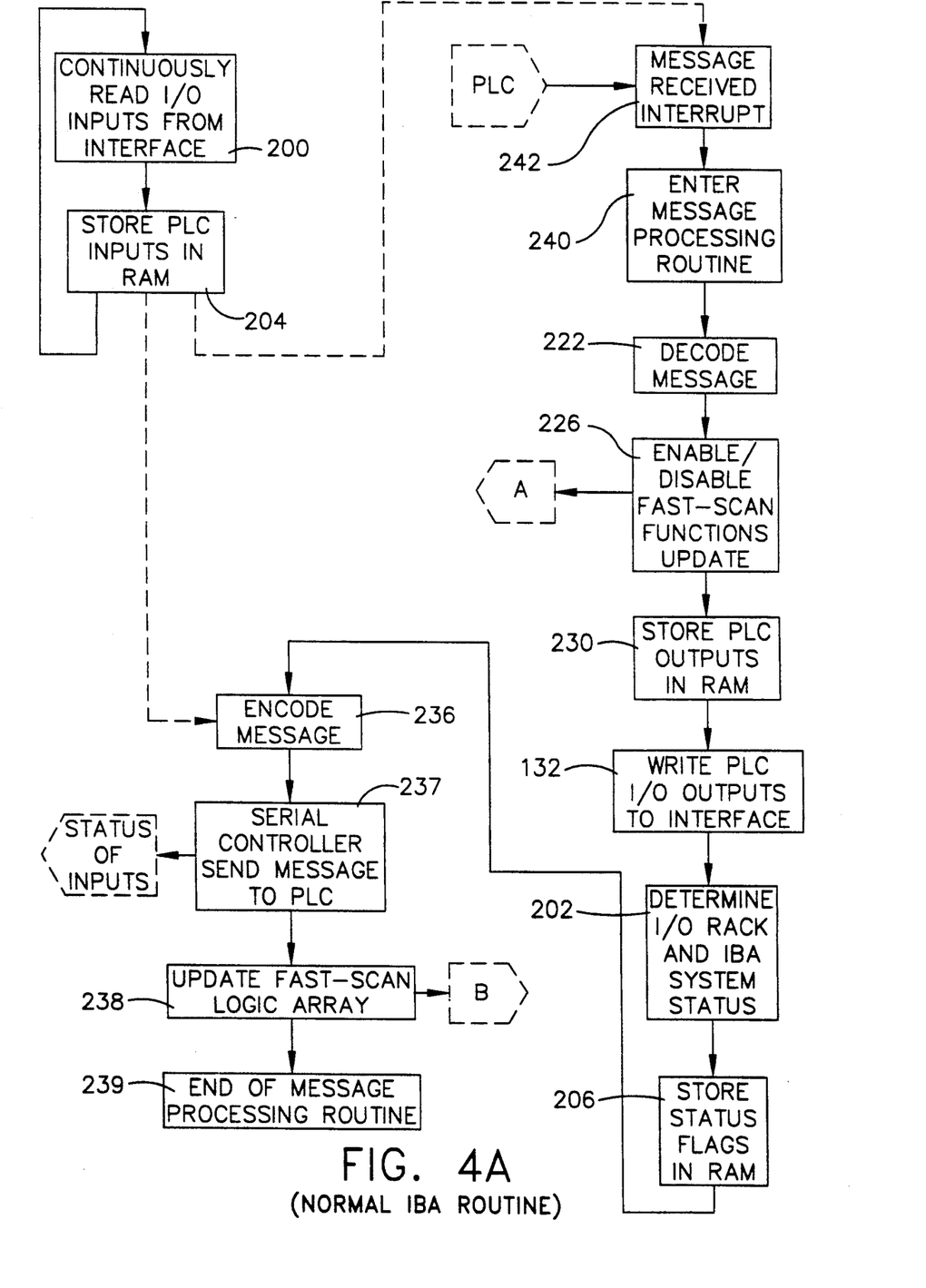
FIGS. 4A and 4B are flow charts depicting the operating decisions and controlling method of the intelligent bus adapter of FIG. 3.
Figure 4B:
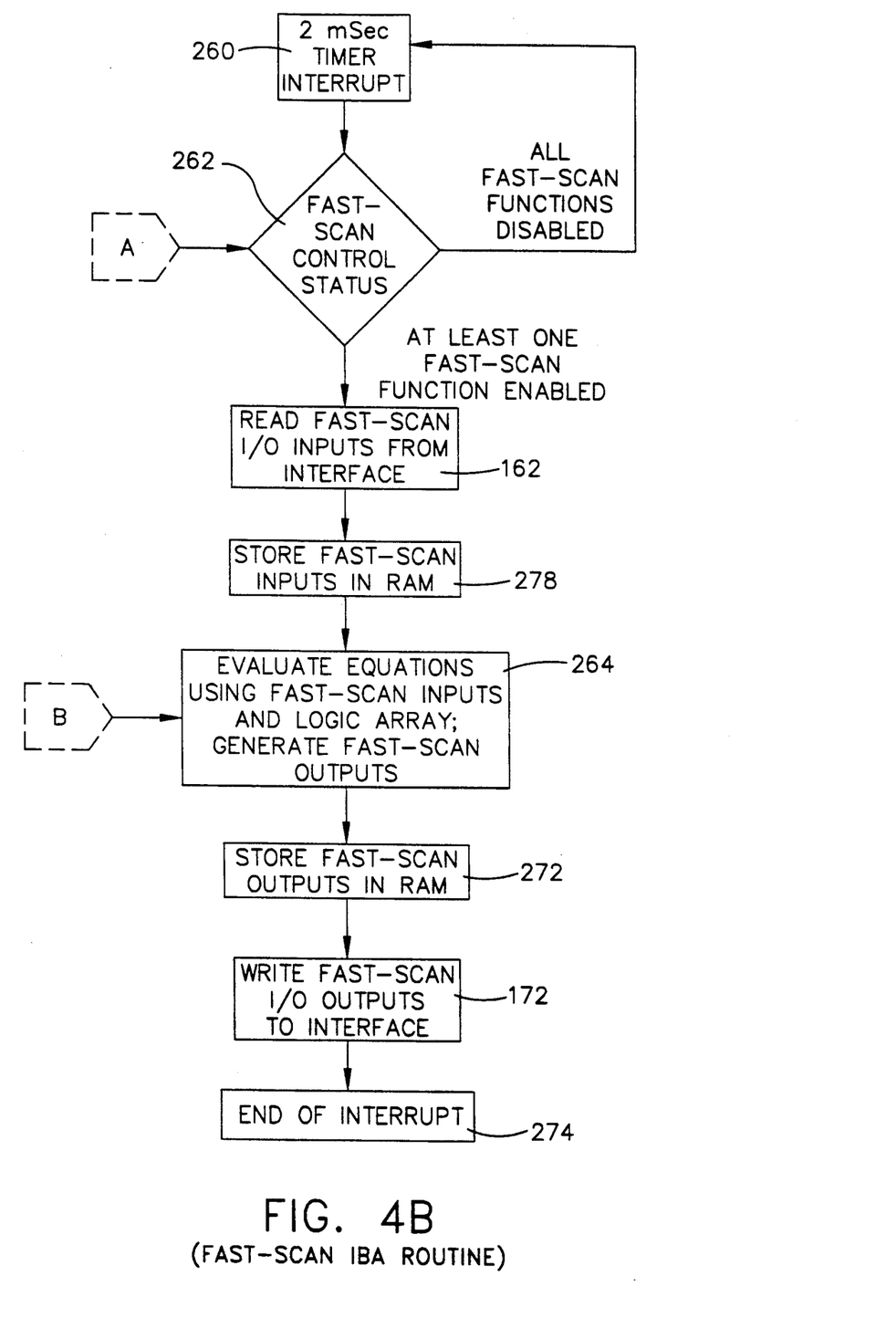

The operational steps of an exemplary IBA 70 are depicted in flow chart form in FIGS. 4A and 4B. All of the associated hardware depicted in FIG. 2 and all of the hardware and routines depicted in FIG. 3 are included in IBA 70; however, FIGS. 4A and 4B shows the details of the decisions that must be made and their necessary sequence.

A continuous read input routine 200 (see FIG. 4A), stored in ROM 114, (which is the same as read PLC input data routine 138) continuously reads all of the inputs that are reported through physical input interfaces 62. After the value of the physical inputs has been determined, a routine to store PLC inputs, designated by the numeral 204, disables all system interrupts, then places this information into PLC input table 78 (see FIG. 2). After the information has been placed into PLC input table 78, the system interrupts are enabled once again. Continuous read input routine 200 can be interrupted by a message received at the serial communication controller 102, by a fast-scan repeat-cycle timer routine 260 (see FIG. 4B), or by some type of alarm event within I/O rack 60, such as can occur if an output fuse fails within a physical output interface 66. If continuous read input routine 200 is not interrupted, then the system repeatedly scans through every physical input on the physical input interfaces 62 within I/O rack 60, continues on to store PLC inputs (using routine 204), then starts over to rescan those same inputs (using routine 200 again).

If continuous read input routine 200 is interrupted because the IBA 70 has receives a message from PLC 54, then the input data which has been stored in RAM 112 (in I/O input data area 142) is used in the preparation of the next message that is to be sent back to PLC 54. The dashed line on FIG. 4A from store PLC inputs in RAM routine 204 to the PLC coding message routine 236 represents this data flow.

The receipt of a message from the PLC 54, via the half duplex serial communication path 59 into serial communication controller 102, generates a chain of events which can be broadly followed on FIG. 4A. Until a message from PLC 54 is received, IBA 70 executes other routines in ROM 114 (such as fast-scan functions, described below, and read I/O inputs, described above). At the end of each store PLC inputs in RAM routine 204, the operating system enables interrupts, thereby allowing an interrupt generated by serial communication controller 102 to occur. Once the "Message Received Interrupt" 242 has occurred, the IBA enters a message processing routine 240 which continues through various routines (that are stored in ROM 114) before returning to the continuous read input routine 200. The dashed line on FIG. 4A from store PLC inputs in RAM routine 204 to the "Message Received Interrupt" 242 represents this control flow.

Once received, the incoming message from PLC 54 is output from serial communication controller 102 via a DMA channel (described above) and is operated on by a message decoding routine 222, which is part of the computer program stored in ROM 114. The portion of the incoming message which concerns enabling or disabling fast-scan functions is communicated through the system data bus 106 into fast-scan data area 228 (part of RAM 112), under the control of a routine 226 that stores the fast-scan information in RAM 112. The portion of the incoming message which concerns the normal PLC outputs is communicated through system data bus 106 into the PLC output table 76, under the control of a routine 230 that stores the normal PLC outputs in RAM 112.

Following the major control flow, output data is now written to the normal PLC outputs under the control of a routine designated by the numeral 132. Write PLC I/O outputs routine 132 communicates the information stored in output table 76, via system data bus 106, to the physical output interfaces 66. Only the normal PLC outputs are controlled by this message. The physical output devices which are controlled by the fast-scan functions are not controlled by these messages.

Another routine stored in ROM 114, designated by the numeral 202, is used to determine the status of I/O rack 60 and IBA 70. This status information is now stored in a status area 208 (part of RAM 112) by a routine designated by the numeral 206. Status area 208 contains information regarding the status of certain routines or conditions within I/O Rack 60. For example, if a fuse fails for one of the physical outputs in a physical output interface 66, then a "fuse fail" flag would be entered into the status area 208. Other examples may include information concerning the fast-scan "lock" or "unlock" status of a particular fast-scan controlled output, or a "lock" or "hold" at most recent value status of an internal equation contained within any fast-scan function. For certain failures, such as the case where an output fuse fails, an interrupt can be generated to more immediately update status area 208, in which case other preventive action may take place within I/O rack 60.

The return message that is sent to the PLC 54 is created by a PLC coding message routine 236, which is part of the computer program stored in ROM 114, and which uses the information in PLC input table 78 and status area 208. The data which has been encoded by PLC coding message routine 236 is sent through system data bus 106 into the serial communication controller 102. At that time, a data message is output from serial communication controller 102 through half duplex serial communication path 59 back to the PLC 54, under the control of a routine designated by the numeral 237.

After the encoding of the PLC message, a routine designated by the numeral 238 (part of the computer program stored in ROM 114) updates the fast-scan logic. Update fast-scan logic array routine 238 causes fast-scan data to be stored in the fast-scan logic array 252 (part of RAM 112), which places the most recently received fast-scan equations and fast-scan commands (such as "Lock" or "Invert" commands) from PLC 54 into the fast-scan logic array 252, just before the fast-scan equations are to be evaluated by fast-scan equation evaluating routine 264, described in greater detail below (see "B" on FIGS. 4A and 4B). In order to save processor execution time, however, this occurs only after a new message has been received from PLC 54 (as represented by the dashed line on FIG. 4B).

After update fast-scan logic array routine 238 has finished storing fast-scan data in the fast-scan logic array 252, this system logic flow arrives at the "End of Message Processing Routine" 239. This completes the set of routines that are executed upon reception of a message from PLC 54, and IBA 70 returns to the continuous read input routine 200.

Referring to FIG. 4B, a repeat-cycle timer initiates an interrupt-driven fast-scan repeat-cycle timer routine 260, and is used to control the timing of all of the fast-scan features of IBA 70. In the illustrated embodiment, fast-scan repeat-cycle timer routine 260 (part of the computer program stored in ROM 114) has a timing interval of two (2) ms, and is used with a software-programmable hardware timer. The initiation of a timing interval by the repeat-cycle timer causes a lower priority maskable interrupt to occur at processor 100. The fast-scan features of the present invention in IBA 70 then are executed, as described below, within a time period that is much less than two (2) milliseconds.

An interrupt service routine is executed upon activation of a new timing cycle, first performing a routine 262 that checks for fast-scan control words. Fast-scan control word checking routine 262 is used to detect fast-scan control words (which specify whether a particular fast-scan function is enabled or disabled) that may exist in any data which has been stored in the fast-scan data area 228 (of RAM 112) by the routine designated by the numeral 226 (see "A" on FIGS. 4A and 4B). If it is determined, by fast-scan control checking routine 262, that there are no enabled fast-scan functions to presently occur, then the "All Fast-scan Functions Disabled" conclusion is invoked, and the control flow terminates the interrupt service routine, and performs no further fast-scan functions until the initiation of a new two millisecond timing interval caused by fast-scan repeat-cycle timer routine 260.

If, on the other hand, fast-scan control checking routine 262 determines that fast-scan functions are to presently occur, then the "At Least One Fast-scan Function Enabled" conclusion is invoked, and the control flow continues to perform the fast-scan functions, beginning with the read fast-scan I/O input data routine 162 (which is part of the computer program stored in ROM 114).

In order for the fast-scan features of IBA 70 to be optimally performed, the most recent input data must be obtained from physical input interface 62. The most recent state of physical input devices that are connected to physical input interfaces 62 is communicated via system data bus 106 to RAM 112 under the control of the read fast-scan I/O input data routine 162. The current value of the inputs is loaded into the fast-scan input table 86, which is part of RAM 112, under the control of a store fast-scan inputs routine 278.

At this time, the fast-scan logic array 252 is loaded with the current fast-scan logical information (including control information) by the update fast-scan logic array routine 238. At step 264, the fast-scan equations are evaluated, and the fast-scan outputs are generated. Fast-scan equation evaluating routine 264 (part of ROM 114) requires data from the fast-scan logic array area 252 (part of RAM 112), and from the fast-scan input table 86 (which is also an area of RAM 112). Once updated with the most recent necessary data, all of the fast-scan equations are evaluated by fast-scan equation evaluating routine 264, whether they be logical or mathematical equations. The results of those equations can be now used to generate the correct value of the fast-scan outputs. As stated above, the fast-scan inputs and outputs can either be binary or analog values, and the inputs can be derived from both binary and analog input interfaces. The fast-scan equations and fast-scan I/O values can ultimately control the outputs of both binary and analog output interfaces.

After fast-scan equation evaluating routine 264 has determined the correct value of all of the fast-scan outputs, the necessary data is sent via the system data bus 106 and loaded into the fast-scan output table 84 (part of RAM 112), under the control of a store fast-scan I/O outputs routine 272. The control flow now arrives at a routine 172 which writes the fast-scan I/O outputs data to the physical outputs, via the system data bus 106. As noted above, the fast-scan outputs are those physical outputs which are controlled by the fast-scan functions of IBA 70, and which are not controlled by the PLC equations and output results.

Once the fast-scan outputs have been written to under the control of write fast-scan I/O outputs routine 172, the "End of Interrupt" 274 of the interrupt service routine is reached, thereby terminating the fast-scan features of IBA 70 until the initiation of the next timing interval by the repeat-cycle timer. Since new messages are received by the high-speed serial path 59 from PLC 54 only every 25 to 50 ms, it is quite evident that the timing interval (e.g., 2 ms) of all the fast-scan functions of IBA 70 will occur many times for each new message from PLC 54. The fast-scan features of IBA 70 make the overall control system much more responsive to particular physical inputs which are to control, or partially control, certain physical outputs.

The control flow charts depicted on FIGS. 4A and 4B are preferably implemented in software by an intelligent bus adaptor interface that has enough memory capacity in both ROM and RAM. Any PLC system which uses I/O racks and intelligent bus adapters can be configured to use the fast-scan features of the present invention, as long as the necessary hardware data paths exist between the I/O interfaces and the intelligent bus adapter interface, and as long as the necessary communication paths exist between the intelligent bus adapter interface and the main processing portions of the PLC. The timing intervals of the fast-scan features can be fixed at any desirable timing as long as the processing unit of the IBA 70 can manipulate the command and data movements throughout the IBA 70 in a short enough time period to keep up with the interval chosen by the designer.

In the embodiment illustrated and described herein, two (2) ms is chosen for this timing interval so that the fast-scan functions can perform at least an order of magnitude more frequently than the controlling capability of the PLC to change its normal PLC physical outputs. As the processing speed of electronic parts continues to improve, any fast-scan functions can, accordingly, also become based on shorter timing intervals. The demands of the process which must be controlled will normally determine the necessary speed of any control system. The fast-scan features of the present invention merely allow much more responsive control of certain physical outputs by use of PLC equipment which is available to today's designer.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A method of controlling physical devices, comprising the steps of:
   (a) periodically evaluating a set of normal equations at a first rate to produce at least one first output value for physical output interfaces providing control signals for physical devices;
   (b) periodically evaluating a set of fast-scan equations at a second rate greater than the first rate to produce a second output value for at least one selected one of said physical output interfaces; and
   (c) selectively controlling said at least one selected physical output interface in response to said first output value and said second output value.

2. The method of controlling physical devices as recited in claim 1, wherein said fast-scan equations are selectively enabled and disabled, and wherein a selected one of said physical output interfaces for which fast-scan equations are evaluated is controlled in response to said first output value until the associated fast-scan equation is enabled.

3. The method of controlling physical devices as recited in claim 1, wherein said fast-scan equations are selectively enabled and disabled, and wherein a selected one of said physical output interfaces for which fast-scan equations are evaluated is controlled in response to said second output value until the associated fast-scan equation is disabled.

4. The method of controlling physical devices as recited in claim 1, further comprising the step of sensing the value of a physical input device, the sensed value of the physical input device being used in the evaluation of the normal equations and the fast-scan equations.

5. The method of controlling physical devices as recited in claim 1, wherein each of said normal equations relates the value of an associated physical output device with at least one of: values of a physical input device, internal analog variable value, internal binary variable value, time dependent variable value, count dependent variable value, and status flag.

6. The method of controlling physical devices as recited in claim 1, wherein each of said fast-scan equations relates the value of an associated physical output device with at least one of: values of a physical input device, internal analog variable value, internal binary variable value, time dependent variable value, count dependent variable value, and status flag.

7. A programmable controller for controlling physical devices, comprising:
   (a) means for periodically evaluating a set of normal equations at a first rate to produce output values for physical output interfaces producing control signals for at least one physical device;
   (b) means for periodically evaluating a set of fast-scan equations at a second rate greater than the first rate to produce output values for selected of said physical output interfaces; and
   (c) means for selectively controlling the selected physical output interfaces in response to the output values determined in response to said fast-scan equations and the output values determined in response to said normal equations.

8. The apparatus as recited in claim 7, further comprising means for selectively enabling and disabling fast-scan equations, wherein the means for selectively controlling the physical output interfaces transfers the associated output value produced by evaluation of the normal equations to said at least one physical output interface for which the associated one of the set of fast scan equations is disabled.

9. The apparatus as recited in claim 7, further comprising means for selectively enabling and disabling fast-scan equations, wherein the means for selectively controlling the physical output interfaces transfers the associated output value produced by evaluation of the fast-scan equations to said at least one physical output interface for which the associated one of the set of fast scan equations is enabled.

10. An apparatus for controlling physical output devices, comprising:
   (a) a programmable logic controller for periodically evaluating normal equations to produce a plurality of first output values for physical output devices, the programmable logic controller producing said first output values at a first rate:
   (b) at least one input/output rack, which includes:
      (i) at least one physical output interface for applying a control signal to a physical device in response to an output value;
      (ii) an intelligent bus adaptor, which includes:
         (A) means for receiving at least one of said plurality of first output values produced by the programmable logic controller;
         (B) a processing unit for periodically evaluating at least one fast-scan equation to produce at least one second output value for controlling said at least one physical output interface, the processing unit producing said second output value at a second rate greater than said first rate; and
         (C) means for selectively transferring one of said first and second output values to said at least one physical output interface.

11. The apparatus as recited in claim 10, further comprising means for selectively enabling and disabling fast-scan equations, wherein the means for selectively transferring output values to said at least one physical output interface transfers the associated first output value to said at least one physical output interface for which the associated at least one fast scan equation is disabled.

12. The apparatus as recited in claim 10, further comprising means for selectively enabling and disabling fast-scan equations, wherein the means for selectively transferring output values to said at least one physical output interface transfers the associated second output value to said at least one physical output interface for which the associated at least one fast scan equation is enabled.

13. The apparatus as recited in claim 11, wherein the means for selectively enabling and disabling fast-scan equations is responsive to control data received from the programmable logic controller, the control data defining the at least one fast-scan equation for which evaluation is enabled.

14. The apparatus as recited in claim 12, wherein the means for selectively enabling and disabling fast-scan equations is responsive to control data received from the programmable logic controller, the control data defining the at least one fast-scan equation for which evaluation is enabled.

15. The apparatus as recited in claim 10, wherein the input/output rack further comprises at least one physical input interface for sensing a value of a physical input, and the sensed value of the physical input is used in the evaluation of said at least one normal equation and at least one fast-scan equation.

16. The apparatus as recited in claim 15, wherein the processing unit detects the sensed value of said physical input immediately prior to evaluation of each of said at least one fast-scan equation in which the value of the physical input appears.

* * * * *